No. 645,429. Patented Mar. 13, 1900.
C. A. A. RAND.
TRACTION WHEEL FOR AGRICULTURAL MACHINES.
(Application filed Jan. 17, 1898. Renewed Feb. 9, 1900.)
(No Model.)
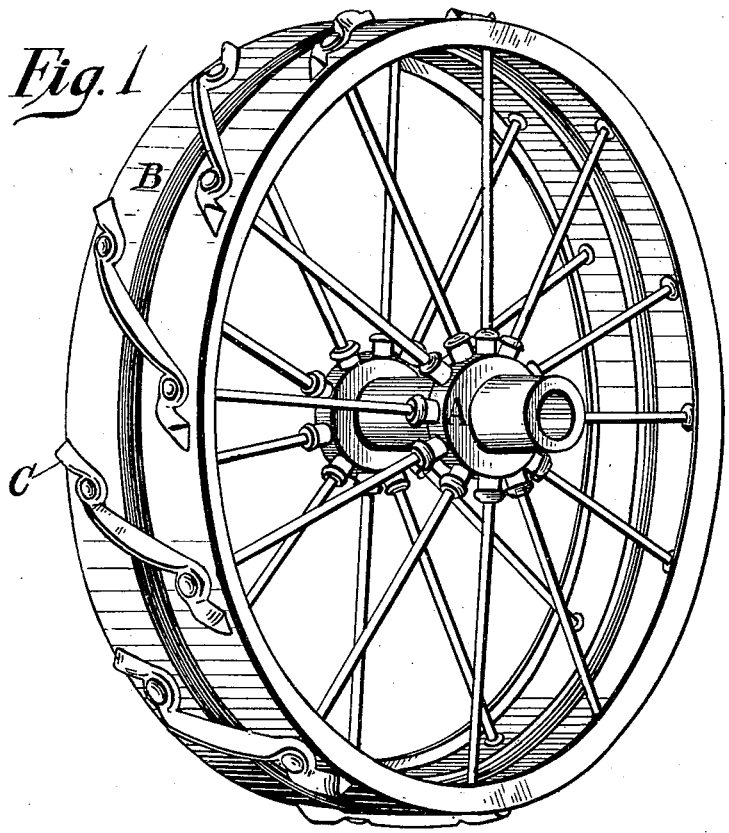
*Fig. 1*
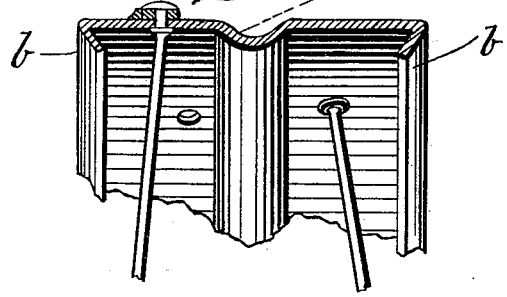
*Fig. 2*
*Fig. 3*
Witnesses.
Inventor.
Charles A. Anderson Rand
By J. F. Steward
His Atty.

UNITED STATES PATENT OFFICE.

CHARLES A. ANDERSON RAND, OF CHICAGO, ILLINOIS, ASSIGNOR TO THE DEERING HARVESTER COMPANY, OF SAME PLACE.

TRACTION-WHEEL FOR AGRICULTURAL MACHINES.

SPECIFICATION forming part of Letters Patent No. 645,429, dated March 13, 1900.

Application filed January 17, 1898. Renewed February 9, 1900. Serial No. 4,694. (No model.)

*To all whom it may concern:*

Be it known that I, CHARLES A. ANDERSON RAND, of Chicago, in the county of Cook and State of Illinois, have invented a new and useful article of manufacture which consists in a Traction-Wheel for Agricultural Machines and other Purposes, of which the following is a full description, reference being had to the accompanying drawings, in which—

Figure 1 is a perspective view of a complete wheel. Fig. 2 is a perspective view of a segment of the wheel. Fig. 3 is a sectional view of the rim thereof.

The object of my invention is to produce a wheel the rim of which shall be of thin metal to give strength by folding its edges and also form a circumferential depression in its outer surface. By these means I secure great strength and avoid unnecessary weight and consequent expense. I am aware that wheels have been made having rims thickened at the edges; but this, so far as I am aware, has always been done in the process of forming the bar from which the rim is later to be made at the rolling-mills. In those instances where the bar has been formed in the process of rolling there has been produced but a bead at the edges of so little height as to not interfere with bending the tire in making the wheel.

The preferable method of producing my wheel is to take a flat bar of thin metal of width suitably greater than that required for the tread of the wheel when completed, bending said rim in circular form and welding or riveting the adjacent ends thereof and then turning the edges inward toward the axis of the wheel, carrying the said edges far inward, as at an oblique angle to the face of the rim shown, so that any stress upon the edges of the rim of the wheel, such as passing over stones, will not tend to unroll the inwardly-turned edges, as would be the case if they were carried to a position less than vertical and even less than they are shown. The tendency of such stress is to deflect the edges and turn them either outward or inward; but if the angle produced is substantially that shown any pressure upon the edge of the wheel will be resisted to the fullest extent and the rim not inclined to fold in either direction. The inwardly-turned edges, if wide, must be accomplished after the bar is bent in circular form. With suitable rolls I then form the circumferential depression shown, which gives added strength to the face of the wheel proper. The lugs shown are placed in the usual manner.

In the drawings, A is the hub of an ordinary wheel; B, the rim; C, the lugs; $b$, the inwardly-turned edges of the rim of the wheel; $b'$, the circumferential depression; $b^2$, the spokes secured to the rim on either side of the groove.

If it is desired, the circumferential groove may be formed on the inside of the rim, in which case the lugs should be hollowed out to conform thereto. Two or more grooves may be formed in the face of the wheel, if desired.

What I claim as my invention, and desire to secure by Letters Patent, is—

1. As a new article of manufacture, a traction-wheel for agricultural machines and the like, having a metallic rim with a broad flat face adapted to travel on the ground without the interposition of a tire, the edges of said rim having flanges $b$ turned inwardly toward the hub of the wheel, a circumferential groove $b'$ extending around the rim, and transverse lugs secured to the outer face of the rim and spanning the groove.

2. As a new article of manufacture, a traction-wheel for agricultural machines and the like, having a metallic rim with a broad flat face adapted to travel on the ground without the interposition of a tire, the edges of said rim having flanges $b$ turned inwardly toward the hub of the wheel at an angle oblique to the face of the rim, a circumferential groove $b'$ extending centrally around the rim, transverse lugs C secured to the outer face of the rim and spanning the groove, and spokes secured in and to the rim on opposite sides of the groove.

CHARLES A. ANDERSON RAND.

Witnesses:
JOHN F. STEWARD,
MARVELL CRAMER.